US012627483B2

(12) United States Patent
Karia et al.

(10) Patent No.: US 12,627,483 B2
(45) Date of Patent: May 12, 2026

(54) SECURED PARALLEL REALITY CONTENT DISTRIBUTION

(71) Applicant: International Business Machines Corporation, Armonk, NY (US)

(72) Inventors: Jignesh Karia, Thane (IN); Mukundan Sundararajan, Bangalore (IN); Pankaj Satyanarayan Dayama, Bangalore (IN); Shilpa Shetty, Sydney (AU); Neha Shah, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 18/540,276

(22) Filed: Dec. 14, 2023

(65) Prior Publication Data

US 2025/0202692 A1     Jun. 19, 2025

(51) Int. Cl.
| | |
|---|---|
| *H04L 9/08* | (2006.01) |
| *G06F 21/62* | (2013.01) |
| *H04L 9/32* | (2006.01) |

(52) U.S. Cl.
CPC ........ *H04L 9/0861* (2013.01); *G06F 21/6245* (2013.01); *H04L 9/3213* (2013.01); *H04L 9/3236* (2013.01)

(58) Field of Classification Search
CPC ... H04L 9/3236; H04L 9/0861; H04L 9/3213; G06F 21/6245
See application file for complete search history.

(56) References Cited

U.S. PATENT DOCUMENTS

| | | | | |
|---|---|---|---|---|
| 7,103,771 | B2 * | 9/2006 | Grawrock | G06F 21/57 726/9 |
| 11,936,790 | B1 * | 3/2024 | Genner | G06K 19/06037 |
| 2014/0257991 | A1 | 9/2014 | Christensen et al. | |
| 2014/0306994 | A1 | 10/2014 | Brown et al. | |
| 2015/0023602 | A1 * | 1/2015 | Wnuk | G06V 20/20 382/190 |
| 2015/0310492 | A1 | 10/2015 | Zewin et al. | |
| 2017/0318019 | A1 * | 11/2017 | Gordon | G06V 40/67 |
| 2018/0157321 | A1 * | 6/2018 | Liu | H04L 51/046 |
| 2019/0022530 | A1 * | 1/2019 | Kornmann | G07F 17/3272 |
| 2019/0087614 | A1 * | 3/2019 | Nguyen | G06Q 10/087 |
| 2019/0108682 | A1 | 4/2019 | Spivack et al. | |
| 2021/0004481 | A1 * | 1/2021 | Daub | H04W 12/02 |
| 2021/0216443 | A1 * | 7/2021 | Park | G06F 11/3688 |
| 2021/0297255 | A1 * | 9/2021 | Wan | H04L 63/0442 |
| 2021/0327148 | A1 * | 10/2021 | Goldberg | G06V 40/10 |
| 2021/0327551 | A1 * | 10/2021 | Narayanswamy | G16H 40/67 |
| 2022/0084074 | A1 | 3/2022 | Maddern et al. | |

(Continued)

OTHER PUBLICATIONS

"How to benefit from consent-based marketing", Usercentrics, Jan. 30, 2023, 16 pps., <https://usercentrics.com/knowledge-hub/consent-based-marketing/>.

(Continued)

*Primary Examiner* — Mohammad A Siddiqi
(74) *Attorney, Agent, or Firm* — Andre L. Adkins

(57) ABSTRACT

Techniques are described with respect to a system, method, and computer program product for parallel reality-based content presentation. An associated method includes receiving a viewing event; analyzing the viewing event, and generating a privatized parallel reality-based credential associated with a user based on the analysis.

20 Claims, 6 Drawing Sheets

(56) References Cited

U.S. PATENT DOCUMENTS

| | | | |
|---|---|---|---|
| 2024/0291665 A1* | 8/2024 | Seo | G06V 20/95 |
| 2025/0103997 A1* | 3/2025 | Abelow | G06Q 30/0601 |
| 2025/0265795 A1* | 8/2025 | Berkebile | G06F 3/012 |

OTHER PUBLICATIONS

"Portable Modifiable Personal Billboard", An IP.com Prior Art Database Technical Disclosure, IP.com No. IPCOM000028487D, IP.com Electronic Publication Date: May 17, 2004, 5 pps., <https://priorart.ip.com/IPCOM/000028487>.

Jansen, et al., "On Rectangle Packing: Maximizing Benefits", Conference Paper, Jan. 2004, 11 pps., <https://www.researchgate.net/publication/220779502_On_Rectangle_Packing_Maximizing_Benefits>.

Khan, "Approximation Algorithms for Rectangle Packing", IISc Bangalore, 59 pps. , Feb. 10, 2020, <https://www.iith.ac.in/~caldam2020/talks/school-arindam.pdf>.

Kramer, "Delta Air Lines Wows With Parallel Reality", 5 pps., Forbes, Oct. 19, 2022, <https://www.forbes.com/sites/scottkramer/2022/10/19/delta-airlines-wows-with-parallel-reality/?sh=264fd78938e9>.

Schlosser, "Parallel Reality' at the airport: High-tech screen displays personal flight info to multiple travelers", Geekwire, 10 pps., Jun. 30, 2022, <https://www.geekwire.com/2022/parallel-reality-at-the-airport-high-tech-screen-uses-facial-recognition-to-personalize-flight-info/>.

Strasser, "Personalization through mask marketing", Proceedings of the 36th Hawaii International Conference on System Sciences (HICSS'03), © 2002 IEEE, 8 pps., <https://ieeexplore.ieee.org/document/1174582>.

* cited by examiner

600

START

Receiving a viewing event — 610

Analyzing the viewing event — 620

Extracting user edge device information — 630

Hosting digital promotion space auction — 640

Generating virtual token of user — 650

Generating vector with the virtual token within — 660

Visualizing promotional content based on generated vector — 670

SECURED PARALLEL REALITY CONTENT DISTRIBUTION

BACKGROUND

This disclosure relates generally to the field of secured data streaming, and more particularly to secured content distribution to parallel reality-based systems.

The concept of parallel reality provides simultaneously presentation of digital content to two or more viewers, in which each viewers digital content may comprise different information configured to be visible from various viewing directions, respectively. The digital content is traditionally presented on parallel reality displays that utilize parallel reality pixels comprising the ability to simultaneously output millions of controllable rays to specific users, devices, or areas. Parallel reality has become integrated into various areas of technology including, but not limited to virtual reality (VR), augmented reality (AR), extended reality (XR), mixed reality (MR), and the like in order to facilitate shared virtual worlds, gaming experiences, destination entry systems, etc. As with most systems associated with distributing user-specific digital content, parallel reality systems utilize protected information associated with users in order to provide digital content to the users tailored based on preferences, geographic location, user patterns/analytics, etc. In particular, customized content may be presented to users based on proper identification of each user; however, it may be advantageous to have a mechanism to provide verification of the user and privatization of the user data prior to outputting the controllable rays to the respective users.

SUMMARY

Additional aspects and/or advantages will be set forth in part in the description which follows and, in part, will be apparent from the description, or may be learned by practice of the invention.

A system, method, and computer program product for parallel reality-based content presentation is disclosed herein. In some embodiments, a computer-implemented method for parallel reality-based content presentation comprises receiving a viewing event; analyzing the viewing event; and generating a privatized parallel reality-based credential associated with a user based on the analysis.

In some aspects of an embodiment of the present invention, a processor operating a privatization module processes a viewing event by cleansing a plurality of user data associated with a user of the viewing event by detecting a user edge device associated with the user; extracting a plurality of user edge device information from the user edge device; and generating a request to privatize the plurality of user data based on the extracted user edge device information.

In some aspects of an embodiment of the present invention, the generation of the privatized parallel reality-based credential comprises generating a virtual token associated with the user; vectorizing the virtual token and a subset of the plurality of user data; and generating a hash of the resulting vector of the vectorizing. The privatized parallel reality-based credential is configured to be utilized by a customized content server upon approval by the privatization module.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
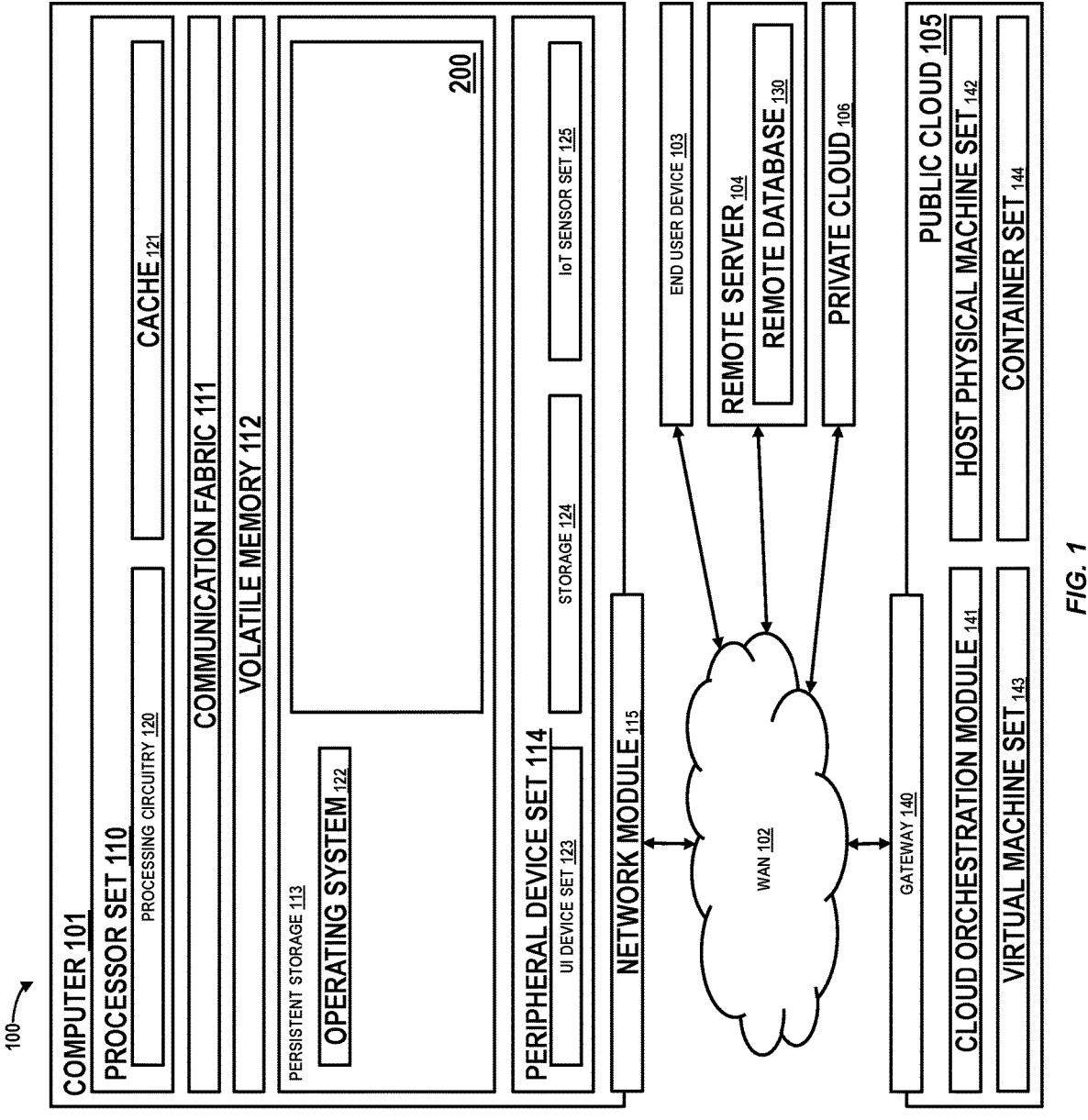
FIG. 1 illustrates a networked computer environment, according to an exemplary embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The following described exemplary embodiments provide a method, computer system, and computer program product for parallel reality-based content presentation. Parallel reality provides the ability for multiple viewers to engage with different digital content in real-time; in which the digital content experience of the viewer is not only subject to information associated with the user, but also based on various factors such as but not limited to the means of display depicting digital content, applicable venue, etc. As a result of this, privacy and security of user data is essential when providing customized content within the digital content. In particular, customized content is generally provided by content providers who engage with entities such as telecom service providers tasked with managing the parallel reality displays the customized content is depicted on. The ability for these entities to ensure security and privatization of user data not only optimizes the parallel reality experience for viewers within various venues (e.g., public venues), but also ensures that content providers do not have access to confidential elements of the user data that are taken into account when tailoring digital content for specific users, devices, areas, and the like. In particular, promotional content may be presented to users based on proper identification of each user; however, it may be advantageous to have a mechanism to provide verification of the user and privatization of the user data prior to outputting the controllable rays to the respective users. Thus, the present embodiments have the capacity to optimize presentation and distribution of digital content for parallel reality-based systems by providing mechanisms that privatize user data preventing full access from digital content providers. Furthermore, the present embodiments have the capacity to optimize computing for parallel reality-based systems by providing mechanisms to simultaneously generate specific parallel reality-based credentials configured to be shared with digital content providers in a scalable manner, as well as harness a network of pixel processors to efficiently coordinate light ray distribution in a secure manner.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

As described herein "parallel reality" refers to technology that enables precision spatial calibration to compute a plurality of parallel reality pixels configured to simultaneously output controllable rays of various colors and brightness. In some embodiments, the controllable rays are configured to be user, device, and/or area-specific, in which the rays are assigned to destinations in dimensional space.

It is further understood that although this disclosure includes a detailed description on cloud-computing, implementation of the teachings recited herein are not limited to a cloud-computing environment. Rather, embodiments of the present invention are capable of being implemented in conjunction with any other type of computing environment now known or later developed.

The following described exemplary embodiments provide a system, method, and computer program product for parallel reality-based content presentation. Referring now to FIG. 1, a computing environment 100 contains an example of an environment for the execution of at least some of the computer code involved in performing the inventive methods, such as system 200. In addition to system 200, computing environment 100 contains an example of an environment for the execution of at least some of the computer code involved in performing the inventive methods. Computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and system 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, computer-mediated reality device (e.g., AR/VR headsets, AR/VR goggles, AR/VR glasses, etc.), mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) payment device), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD payment device. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter payment device or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
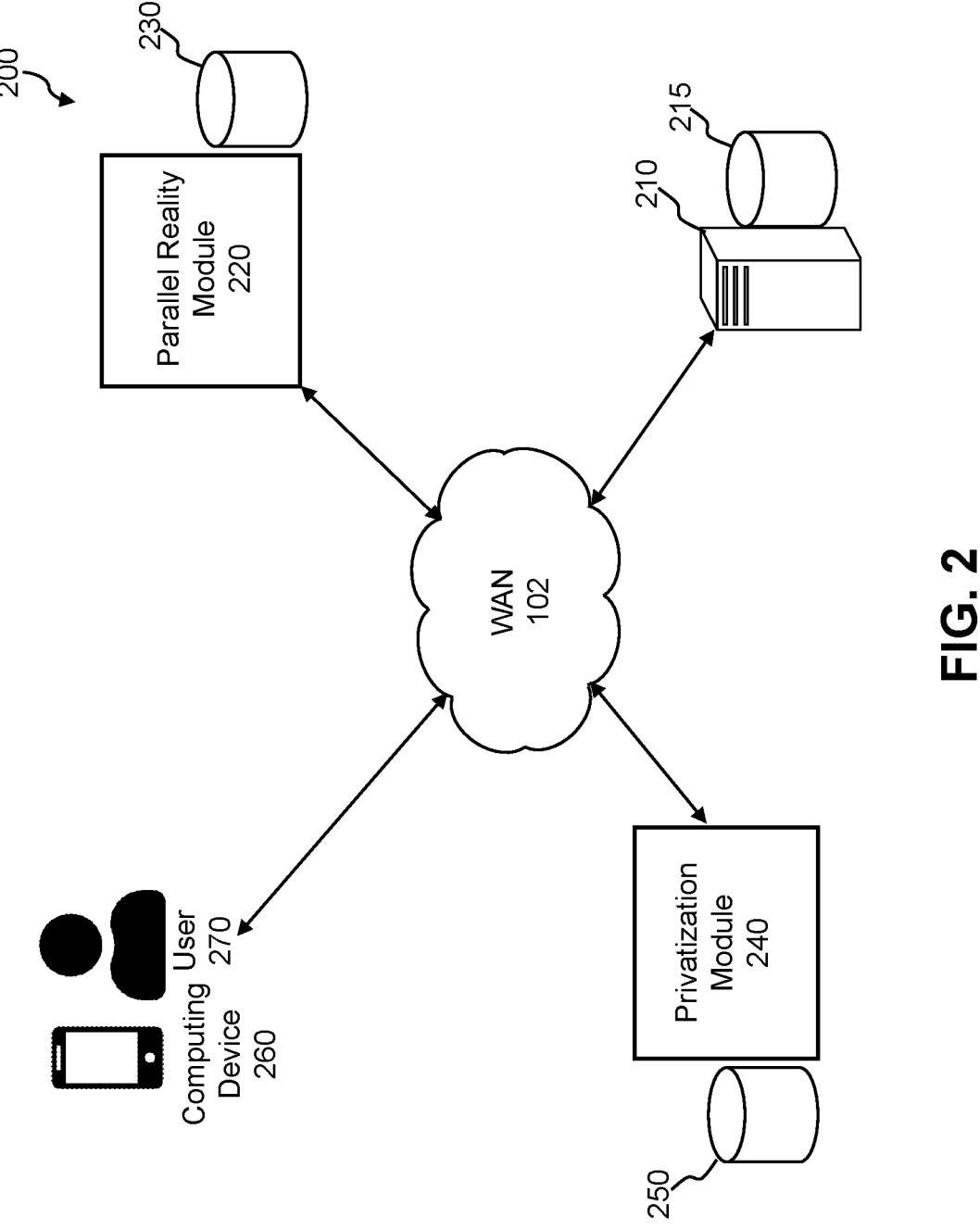
FIG. 2 illustrates a block diagram of a parallel reality-based digital content distribution system environment, according to an exemplary embodiment.

Referring now to FIG. 2, a functional block diagram of a networked computer environment illustrating a computing environment for a parallel reality-based digital content distribution system 200 (hereinafter "system") comprising a server 210 communicatively coupled to a database 215, a parallel reality module 220, a parallel reality module database 230, a privatization module 240, a privatization module database 250, a first computing device 260 associated with a first user 270, and a second computing device 280 associated with a second user 290, each of which are communicatively coupled over WAN 102 (hereinafter "network") and data from the components of system 200 transmitted across the network is stored in database 215.

In some embodiments, server 210 is tasked with providing the platform configured to facilitate parallel reality-based digital content distribution, in which a credentialing entity such as, but not limited to a telecom operator, mobile network provider, or any other applicable party known to those of ordinary skill in the art may access the platform over computing devices in order to interact with users 270 and 290. It should be noted that an integral task of the credentialing entity is to privatize user data of users 270 and 290 in a manner in which their respective data (e.g., mobile number, personal identifiable information, access codes, etc.) is anonymized from digital content providers for security purposes. Due to digital content providers intelligently displaying customized digital content tailored to the respective viewer, it is important for the credentialing entity to serve as the gatekeeper for user data so that user edge device information associated with computing devices 260 and 280 is extracted from the user data allowing digital content providers to generate customized digital content for users 270 and 290 without having access to the totality of user data. Thus, the credentialing entity may utilize the platform to not only view/edit data pertaining to one or more of user data, analytics, preferences, credential issuance, etc.; but also, track and monitor cognitive techniques performed on the aforementioned by privatization module 240 via one or more graphical user interfaces presented to the applicable computing device associated with the credentialing entity.

Furthermore, server 210 may be communicatively coupled to one or more web crawlers configured to crawl applicable web-based data sources in order to extract relevant data associated with geographic location of users 270 and 290 (e.g., weather data, traffic data, etc.), contextual information (e.g., public venue, customized content regarding sensitive material, etc.), social media platforms, crowdsourcing platforms, and the like. In some embodiments, server 210 may generate viewer profiles associated with users 270 and 290 configured to be stored in database 215, in which the viewer profiles serve as aggregations of user edge device information (e.g., mobile number, message header, and the like) derived from computing devices 260 and 280 and user data including, but not limited to personal information, biological data, behavioral data, socio-demographic data, psychographic data, social media-based data, user analytics (e.g., user preferences, activity patterns, etc.), and the like.

Parallel reality module 220 is configured to detect and analyze viewing events associated with users 270 and 290 in addition to managing the output and visualization of parallel reality pixels to users 270 and 290 (i.e., computing devices 260 and 280). For example, parallel reality module 220 may utilize the parallel reality pixels to simultaneously output controllable rays of different colors and brightness to computing devices 260 and 280, in which the controllable rays may comprise software directed to users 270 and 290. Thus, distinct customized content unique to users 270 and 290 is simultaneously presented to computing devices 260 and 280; however, in order for the personalized digital content to be presented parallel reality module 220 must communicate with privatization module 240 in order to authenticate the applicable digital content provider(s). Parallel reality module 220 is able to analyze viewing events of users 270 and 290, configure parameters of the viewing events based on various factors, communicate with privatization module 240 to receive custom digital content, and visualize the personalized digital content within the parallel reality pixels. Various factors for configuring the parameters may include, but are not limited to the location of a viewing event (e.g., public venue, virtual venue, etc.), the type of viewing event (e.g., QR code-based, electromagnetic fields detection, gaze detection, bare eye presentation, etc.), the viewer profile of user 270 and/or user 290, the relationship between users 270 and 290, and the like. For example if users 270 and 290 are in an airport terminal, parallel reality module 220 may utilize one or more applicable sensors to interact with QR codes associated with their respective boarding passes in order to coordinate the pixels that make up the display together to provide different images from different stand points and as a result create different customized content for each individual. However in light of the fact that interacting with the QR codes may manifest otherwise protected information associated with users 270 and 290, parallel reality module 220 must communicate with privatization module 240 prior to visualizing the personalized digital content in order to render it in a secure manner. Parallel reality module 220 utilizes artificial intelligence and cognitive techniques in order to perform analyses on the viewing events and stores analyses along features/characteristics derived from the analyses in database 215.

Privatization module 240 is configured to manage the privatizing of user data by generating privatized parallel reality-based credentials along with perform allocation of personalized digital content distribution. Privatization module 240 is designed to perform allocation of personalized digital content distribution in a variety of ways including, but not limited to managing an approval list of digital content providers, hosting auctions for receiving bids from digital content providers, performing proactive data scrubbing on user data, matching customized content to viewing event requirements, and the like. In some embodiments, privatization module 240 is configured to utilize machine learning techniques on viewer profiles and information derived from the analyses of the viewing events in order to generate vectors of virtual tokens associated with users 270 and 290, in which the virtual tokens represent both the parallel reality-based credentials, subsets of the user data, user preferences, etc; and the virtual tokens are configured to be received by the applicable digital content provider or the Telecom Access Provider (entity associated with the venue where the customized content is presented). The vectors are correlated with the applicable viewer profile and stored in privatization module database 250. It should be noted that privatization module 240 is tasked with providing means for hashing the vectors, in which message headers are utilized in order to scalably query the customized content providers resulting in the vector being distributed to the digital content providers in a secure manner based upon confirmation. In an embodiment, privatization module 240 is further configured to generate thresholds associated with auctioning of a promotional digital content opportunity, in which the thresholds may be based on one or more of relevance to users 270 and/or 290, viewing event requirements (e.g., dimensions of display, TAP network bandwidth, etc.), location of the venue associated with the viewing event, and the like.

Computing devices 260 and 280 may take the form of a desktop computer, laptop computer, tablet computer, computer-mediated reality device (CMR), smart phone, smart watch or other wearable computer, mainframe computer, quantum computer or any other form of computer or mobile device now known or to be developed in the future that is capable of running a program, accessing a network or querying a database. However, viewing events are not required to be interactions between a visual indicator (e.g., QR code, RFID, etc.) and computing devices 260 and 280. For example, parallel reality module 220 may be triggered to visualize parallel reality pixels in accordance with the generated privatized parallel reality-based credential based on various factors such as, but not limited to user gaze detection, detected demographic of a venue where the parallel reality pixels are being depicted, user preferences, and the like.

Figure 3:
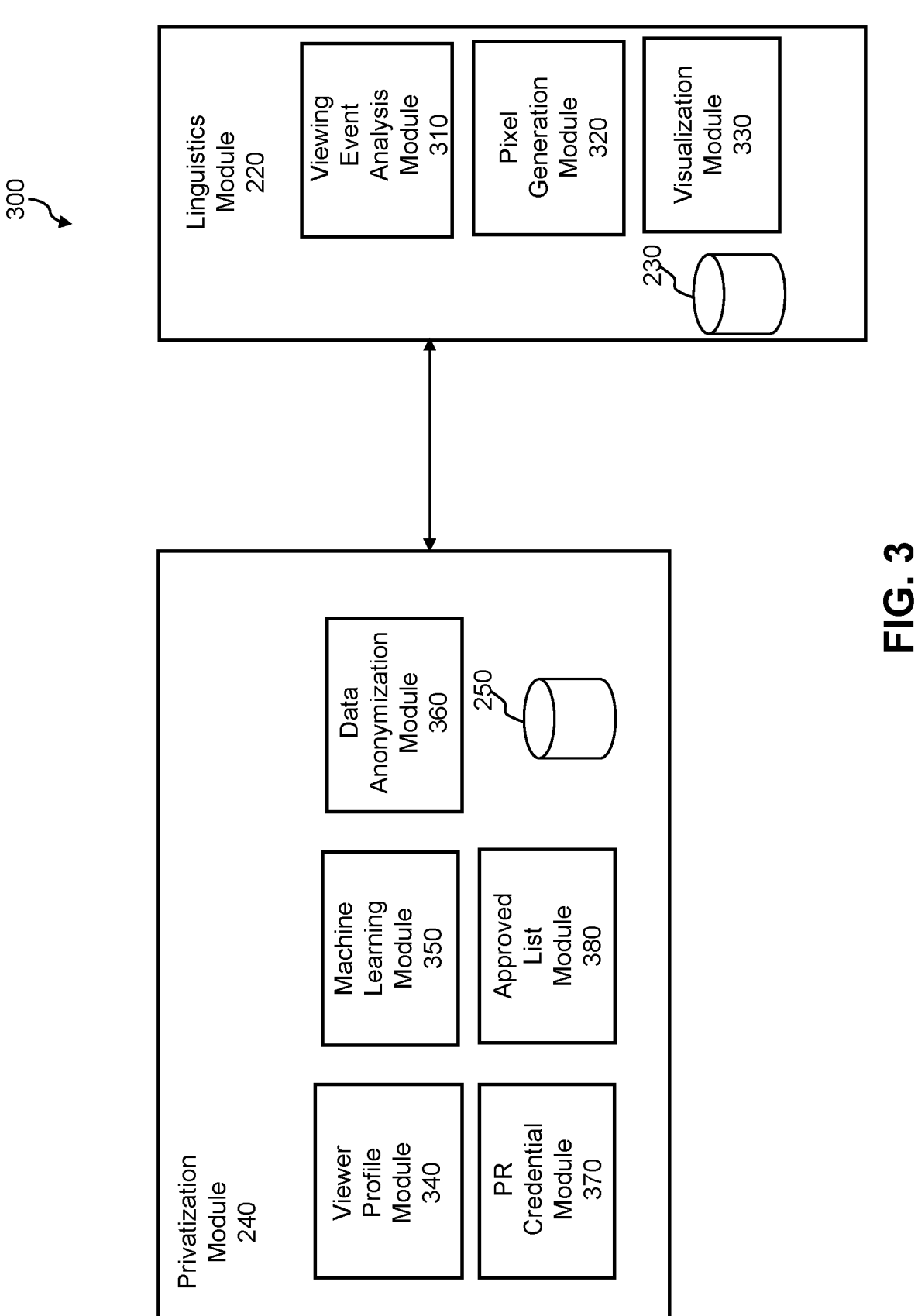
FIG. 3 illustrates a block diagram of various modules associated with the parallel reality-based digital content distribution system of FIG. 2, according to an exemplary embodiment.

Referring now to FIG. 3, an example architecture 300 of parallel reality module 220 and privatization module 240 is depicted, according to an exemplary embodiment. Parallel reality module 220 comprises viewing event analysis module 310, pixel generation module 320, and visualization module 330. Privatization module 240 comprises viewer profile module 340, machine learning module 350, data anonymization module 360, PR credential module 370, and approved list module 380. It should be noted that parallel reality module 220 and privatization module 240 are communicatively coupled over the network allowing for outputs and/or analyses performed by each respective module to be utilized in applicable training datasets to be utilized by applicable machine learning models operated by machine learning module 350 and/or applicable cognitive systems associated with system 200.

Viewing event analysis module 310 is tasked with performing artificial intelligence and cognitive-based mechanisms on viewing events associated with users 270 and 290 for various purposes such as, but not limited to ascertaining information associated with users 270 and 290 for integration into their respective viewer profiles, acquiring preferences and patterns of users 270 and 290 (e.g., locations, types of venues, types of digital content, such promotional digital content, etc. users interact with most frequently), and the like. In some embodiments, viewing event analysis module 310 may utilize one or more of multi-media detection/analyses systems, computer visioning systems, natural language processing ("NLP")/linguistics processing, predictive analytics, behavioral classification techniques, and the like on viewing events associated with users 270 and 290. As described herein, a viewing event is any applicable trigger, interaction, and/or experience between a user and digital content indicators (e.g., QR codes scanned by computing devices 260 and 280, motion/movement based digital content, and the detection of an eye-gaze of a user). For example, users 270 and 290 may traverse a public venue and upon opting in by users 270 and 290 computing devices 260 and 280 may interact with digital content indicators and/or digital content directly, in which viewing event analysis module 310 determines a viewing event is occurring. Upon this determination, event analysis module 310 ascertains various factors associated with users 270 and 290 including, but not limited to contextual information (e.g., timing, location, venue, etc.), user sentiment (e.g., biological data derived from applicable sensors of computing devices 260 and 280), user reaction to digital content, lookup point analyses (e.g., item/area of interest that prompts a shift of user attention from a first direction to a second direction), and any other applicable data configured to be ascertained from a viewing event known to those of ordinary skill in the art. In some embodiments, results of the analyses performed by viewing event analysis module 310 (e.g., user behavior patterns, sentiments, preferences, etc.) are integrated into respective viewer profiles which may be stored in parallel reality module database 230 in order to optimize analytics associated with users 270 and 290.

Pixel generation module 320 is tasked with rendering and assigning the parallel reality pixels presented to users 270 and 290 and/or computing devices 260 and 280. In particular, pixel generation module 320 harnesses a network of pixel processors to efficiently coordinate light ray distribution in a secure manner by outputting millions of rays of various colors and brightness in real-time based on a parallel reality-based credentials received from PR credential module 370. For example, a first parallel reality-based credential associated with user 270 and a second parallel reality-based credential associated with user 290 are received by pixel generation module 320 which allows pixel generation module 320 to assign a first digital content to computing device 260 and second a second digital content to computing device 280. In some embodiments, pixel generation module 320 is further configured to modify components of digital content by performing one or more of adjusting intensity of customized content within the applicable display, switching pixels/pixel groups on and off, multiplex components of digital content across computing devices 260 and 280, computing device specific code scrambling, and the like. It should be noted that pixel generation module 320 communicates with server 210 and visualization module 330 in order to not only coordinate pixel allocation based on the analysis of the applicable viewing event(s), but also to ascertain various data from one or more sensor systems associated with external devices, in which one or more sensor systems include, but are not limited to, cameras, microphones, position sensors, gyroscopes, accelerometers, pressure sensors, cameras, microphones, temperature sensors, biological-based sensors (e.g., heartrate, biometric signals, etc.), a bar code scanner, an RFID scanner, an infrared camera, a forward-looking infrared (FLIR) camera for heat detection, a time-of-flight camera for measuring distance, a radar sensor, a LiDAR sensor, a temperature sensor, a humidity sensor, a motion sensor, internet-of-things ("IOT") sensors, or any other applicable type of sensors known to those of ordinary skill in the art; thus, pixel generation module 320 may allocate pixels to computing devices based on analyses performed by viewing event analysis module 310 on the viewing event in addition to sensor data derived from the aforementioned sensor systems. Pixel generation module 320 may take into consideration biological data derived from computing devices 260 and 280 (e.g., facial movements, gaze tracking, etc.) and/or external computing devices in communication with computing devices 260 and 280 upon receiving confirmation from users 270 and 290. For example, electromyography (EMG), which is a diagnostic and analysis technique for evaluating and recording electrical activity produced by muscle tissue sourced from computing devices 260 and 280 or any other applicable computing device, and may be taken into consideration when pixel generation module 320 allocates pixels to a given computing device. As a result, pixel generation module 320 facilitates intelligently customized presentation of customized content for as many viewers as possible within a given space.

Visualization module 330 is tasked with presenting the digital content to the applicable computing device based on the designation of pixels by pixel generation module 320. It should be noted that visualization of digital content may be rendered in a physical space, virtual space (e.g., virtual reality, augmented reality, extended reality, mixed reality, and the like), computing device, display device, or any other applicable mechanisms configured to receive digital content. In various embodiments, visualization module 330 utilizes generative adversarial networks (GANs) to render digital content, in which the digital content is selected based on analysis of the viewer profile associated with the user of the viewing event and/or receiving computing device. Visualization module 330 takes into consideration the pixel assignments received from pixel generation module 320 and enables the pixels to send various colors of light in a multitude of directions. Visualization module 330 may communicate with machine learning module 350 in order to operate a feedback loop configured to optimize the presentation of the digital content via supervised and/or unsupervised learning. For example, rendering the visualizations for digital content to perform functionalities such as continuously adapting to the movements and locations of users 270 and 290 so that the digital content can follow users 270 and 290 within physical and/or virtual spaces requires a significant amount of computing resources due to having to process pixel allocations for each specific computing device engaging in viewing events. Thus, it is within the spirit and scope of the disclosure for system 200 to allow visualization module 330 to receive fragments comprising metadata of the generated vectors from privatization module 240 allowing pixel generation module 320 to perform pixel allocation based on the privatized parallel reality-based credential and subsequently visualization module 330 may visualize the pixels accordingly in a scalable manner. In particular utilizing the aforementioned approach, visualization module 330 to perform the rendering of digital content in a scalable manner by visualization module 330 selecting to engage only with pixel processors that have been verified via the privatized parallel reality-based credential as this is an indicator that the digital content has been verified by the applicable credentialing entity and that the information of the receiving user has been privatized and confidential elements preserved.

Viewer Profile module 340 is configured to generate and manages viewer profiles associated with viewers of viewing events. It should be noted that data associated with users 270 and 290 may be ascertained from various sources including, but not limited to applicable sensor data from computing devices 260 and 280 (e.g., biological data, movement/gesture data, viewing analytics, etc.), viewing event user preferences, digital content interaction history, social network profiles, internet-based publications (e.g., articles, blogs, posts, etc.), actions, studies, interests, work assignments, or any other applicable internet-based source configured to be crawled by web crawlers associated with server 210 for ascertainable data known to those of ordinary skill in the art. One of the purposes of the viewer profiles is to assist the credentialing entity with matching the appropriate digital content provider, which optimizes the bidding process for custom digital content opportunities in a manner that preserves confidential information associated with someone engaged with a viewing event. For example in the instance in which a viewing event is initiated via an interaction between user 270 and a QR code comprising sensitive data (i.e., QR code being used for a boarding pass), the credentialing entity would like to retrieve an appropriate particular digital content aligned with the viewer profile of user 270; however, the credentialing entity must maintain confidential elements of the user data of user 270 such as the flight destination associated with the QR code. Thus, the credentialing entity utilizing the viewer profile before creating the applicable digital content opportunity not only allows the appropriate digital content provider that aligns with the preferences of user 270 to have priority when placing a bid for the custom digital content opportunity, but also prevents transmission of confidential elements of the user information (i.e., user information related to the QR code) of user 270 from occurring when the applicable vector is ultimately sent to the digital content provider that is awarded the digital content opportunity where the pixels are displayed.

Machine learning module 350 is configured to use one or more heuristics and/or machine learning models for performing one or more of the various aspects as described herein (including, in various embodiments, the natural language processing or image analysis discussed herein). In some embodiments, the machine learning models may be implemented using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting, and any other applicable machine learning algorithms known to those of ordinary skill in the art. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. For example, machine learning module 350 is designed to maintain one or more machine learning models dealing with training datasets including data derived from one or more of database 215, parallel reality module database 230, privatization module database 350, and any other applicable internet-based data source. Furthermore, the one or more machine learning models are designed to generate outputs representing predictions pertaining to viewing events based on various factors including, but not limited to the viewpoint analyses, analyses of the viewer profiles, contextual information associated with the viewing event (e.g., venue of the viewing event, type of digital content attempting to be presented, etc.), and the like. For example, biological data acquired by computing device 260 may indicate that user 270 is experiencing high stress levels, in which machine learning module 350 may output a prediction indicating that user 270 needs a vacation. As a result, privatization module 240 creates a personalized digital content opportunity with a preference for promotion content provides facilitating customized content that aligns with the prediction (e.g., customized content directed towards vacation packages, massage services, therapy services, etc.). Other predictions relating to classifications of viewing events, target demographics for viewing events based upon the venue (e.g., sports arena, transportation terminal, etc.), and like are within the spirit of the disclosure.

Data anonymization module 360 is tasked with performing proactive scrubbing on the user information associated with users 270 and 290 to cleanse the user information for the purpose of subsequently transmitting redacted derivatives of the user information to applicable digital content providers. It should be noted that privatization module 240 provides informed consent, with notice of the collection of personal data, allowing users to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. The credentialing entity, such as a telecommunications service provider (TSP), requires the user consent in order data scrubbing to occur. In some embodiments, the scrubbing mechanism utilized is employed based on viewer preferences and/or viewer profile analyses in order for approved list module 380 to create a dynamic target pool of viewers with associated vectors comprising redacted user information and virtual tokens. Data anonymization module 360 performs cleansing the plurality of user data by rendering subsets of the user data serving as redactions of user datasets. User edge devices associated with users 270 and 290 are detected by Data anonymization module 360 in order for user edge device information to be extracted from the user edge devices including, but not limited to mobile device number, message header, assigned IP address, MAC address, or any other applicable information configured to be ascertained from an edge device known to those of ordinary skill in art. In some embodiments, the user edge device information is extracted for the purposes of Data anonymization module 360 generating a request to privatize user data, in which the request is transmitted to PR credential module 370 and PR credential module 370 may query privatization module database 250 for the appropriate virtual token that aligns with the request based on the extracted user edge device information. The user edge device information that is extracted from computing devices 260 and 280 and/or applicable communicatively coupled computing device (e.g., wearable device, computer-mediated reality device, etc.) may be transmitted to PR credential module 370 for integration into the vectors associated with users 270 and 290 along with their respective privatized parallel reality-based credential comprising a virtual token. It should be noted that one purpose of the user edge device information is for the TSP to know which users are relevant for providing the personalized digital content information after scrubbing process based on their preferences. Another purpose is for compliance tracking that the digital content that was shown was in accordance with the preference settings.

PR credential module 370 is tasked with generating the user specific vectors associated with users 270 and 290 along with rendering the privatized parallel reality-based credentials for users. It should be noted that the privatized parallel reality-based credential is configured to be transmitted and utilized by one or more digital content servers associated with digital content providers that have been added to the approved list managed by approved list module 380. In an embodiment, the one or more digital content servers are part of a real-time bidding platform. The privatized parallel reality-based credential is a representation of the vector comprising a generated virtual token associated with the users respectively. For example, a vector associated with user 270 may comprise the virtual token, the message header indicating authenticity of the source and type of message (i.e., commercial message header) associated with a telemarketer, and the user edge device information, in which the virtual token assures that data scrubbing has been performed on confidential and/or sensitive information associated with the user. In some embodiments, PR credential module 370 hosts an auction for a digital content opportunity (e.g., display associated with the viewing event) configured to allow digital content providers to bid for the digital content opportunity in a manner that supports targeting towards the viewers associated with viewing events. PR credential module 370 may employ equation 1: $S=\{S_1, \ldots, S_n\}$ Equation (1) S is the applicable telemarketer, L is the location (e.g., venue, display screen the pixels are visualized on if applicable, etc.), D is the message header for sending the message associated with the applicable telemarketer $S_n$; furthermore, $(V_j, M_j)$ represents the vector associated with user 270 in which V is the virtual token generated by PR credential module 370 and M is the mobile number derived from the user edge device information. Digital content providers supply the bids for the digital content opportunity and depending upon the winner of the bid the credentialing entity facilitates the one or more vectors. However, the aforementioned facilitation may be based upon the analyses of the viewing event and/or viewer profile. In some embodiments, PR credential module 370 generates a hash of the vector in order for the vectors to be retrieved from privatization module database 250 in a scalable manner without requiring a significant amount of computing resources. In some embodiments, hashing is performed using standard SHA256 hash function. Hashing scrambles the raw information and outputs a hash value or digest. The hashing is an irreversible operation, which means the hash value or digest does not provide you any information regarding the original plaintext. Hash functions also provide the same output value if the input remains unchanged.

Approved list module 380 is tasked with managing the approved list of viewers that may be auctioned to the digital content providers. In some embodiments, the approved list is a subscribers list comprising a niche pool of customers configured to receive digital content, such as promotional content, based on viewing events. The approved list is configured to be dynamically adjusted as to allow volatile distribution of digital content based on alignment of viewer profiles with the digital content. Viewing event analyses, viewer profile analyses, and other various factors are taken into consideration when compiling the approved list with the intention of nullifying bias. Approved list module 380 transmits the approved list to PR credential module 370 so that the applicable viewers can be correlated with the applicable digital content opportunity associated with the respective viewing event. Approved list module 380 also utilizes matching of user preferences associated with brands, products, services, and the like derived from analyses of the TSPs directly and/or viewer profiles to digital content provided by the TSPs that have access to the approved list granted by the digital content providers. In some embodiments, temporal and spatial factors associated with the viewer and/or viewing event are taken into consideration when approved list module 380 is performing the aforementioned matching. For example, it may be ascertained from analyses of a viewing event and the viewer profile associated with user 290 that user 290 experiences an upset stomach when traveling due to anxiety, in which approved list module 380 may utilize the matching mechanism to predict a promotional digital content opportunity for a customized content provider that facilitates customized content relating to medication such as Bismuth subsalicylate.

Figure 4:
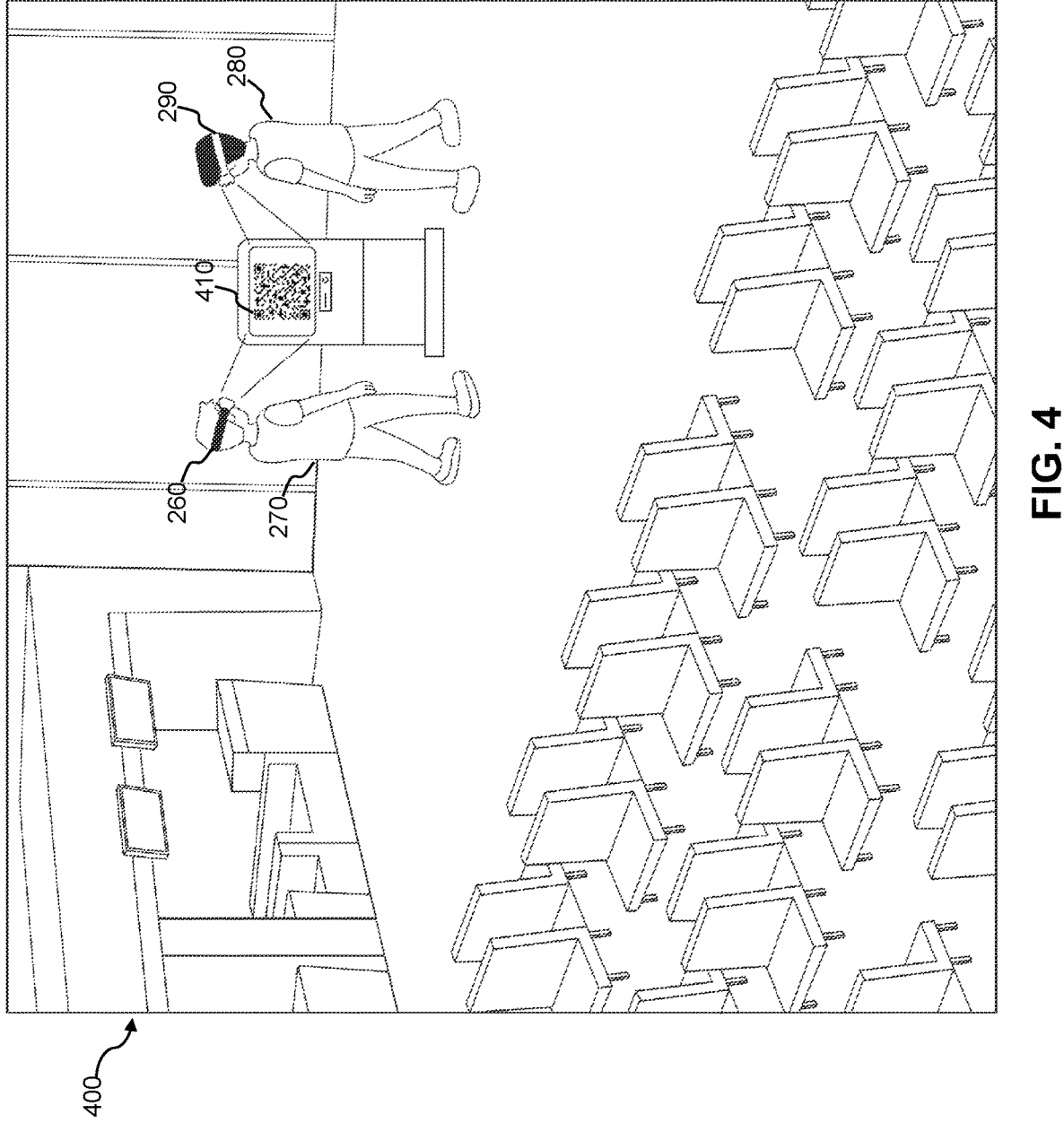
FIG. 4 illustrates viewing events associated with users of the parallel reality-based digital content distribution system of FIG. 2, according to an exemplary embodiment.

Referring now to FIG. 4, a schematic representation of a viewing event 400 associated with users 270 and 290 is depicted, according to an exemplary embodiment. In this particular example, a viewing event indicator 410 is depicted on an applicable display device within a terminal of an airport, in which one or more interactions between computing devices 260 and 280 and viewing event indicator 410 results in the triggering of system 200 to analyze the respective viewing events, generate the respective vectors associated with users 270 and 290, and render the auction for the digital content opportunity associated with the applicable display device. As previously mentioned, data derived from the analyses of the viewing events and viewer profiles along with user edge device information extracted from computing devices 260 and 280 are scrubbed and included in the respective vectors of users 270 and 290. Upon completion of the auction for the digital content opportunity, the approval list comprising the vectors of users 270 and 290 is transmitted to the applicable digital content provider that won the auction allowing one or more servers associated with the winning digital content provider to have enough access to data associated with users 270 and 290 to select personalized digital content for the display device without impacting the security and confidentiality of sensitive data associated with users 270 and 290.

Figure 5:
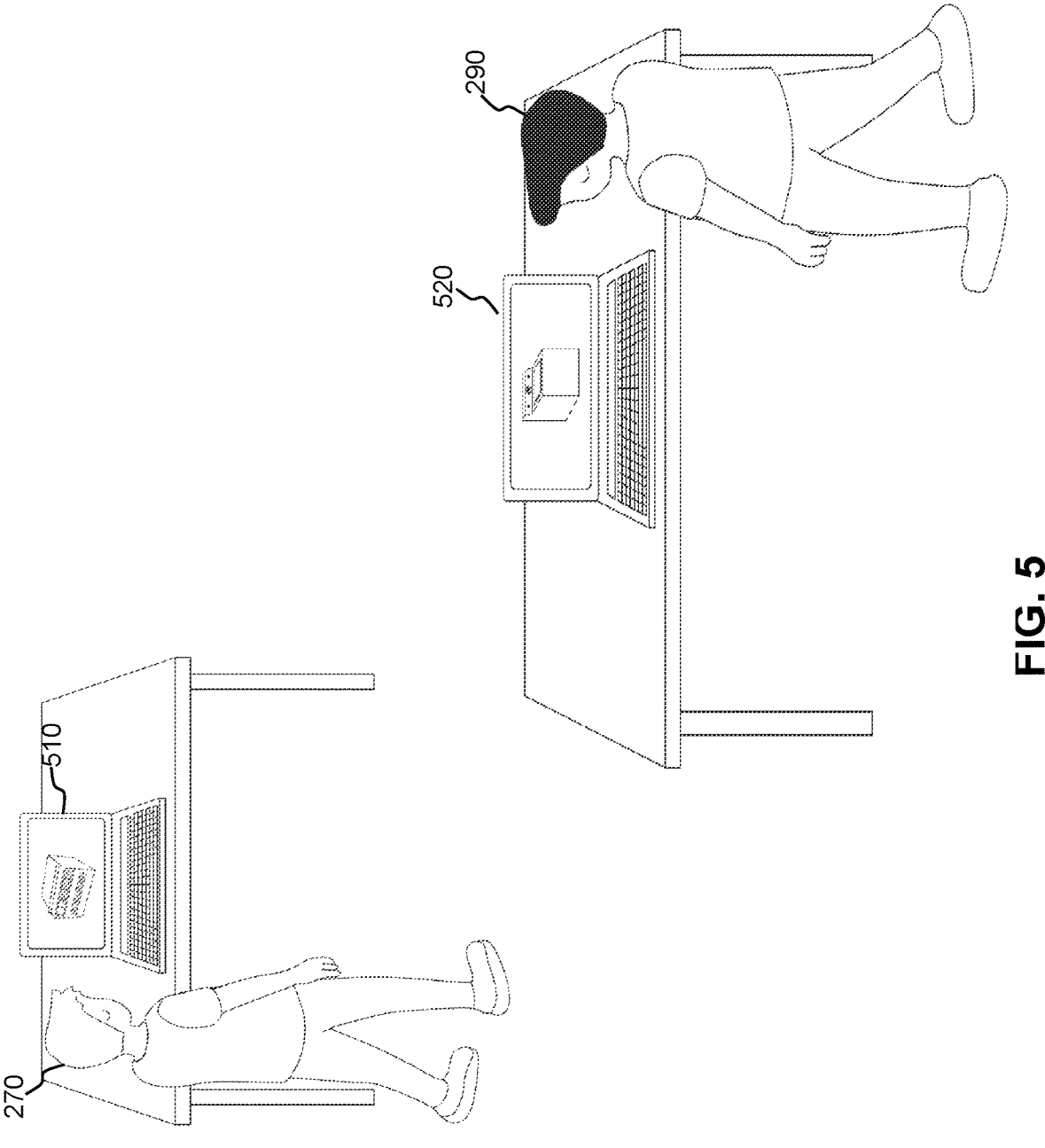
FIG. 5 illustrates secured parallel reality-based customized content presented to the users experiencing the viewing events of FIG. 4, according to an exemplary embodiment.

Referring now to FIG. 5, secured parallel reality-based customized content 500 is depicted, according to an exemplary embodiment. In particular, the digital content provider that won the bid for the digital content opportunity utilizes the respective vectors and as a result presents a first digital content 510 to user 270 and a second digital content 520 to user 290. Simultaneous visualization of the digital content 510 and 510 is accomplished by the parallel reality pixels, in which the parallel reality pixels are configured to present different information visible from different viewing directions, respectively. For example, first digital content 510 may depict customized content for an air conditioner to user 270 and second digital content 520 may depict customized content for a washing machine, in which the respective customized content is selected based on one or more of the aforementioned analyses performed on the viewing event, viewer profile, etc. Due to the security and privacy awarded by the depiction of the pixels, it is within the scope of the disclosure for digital content to be generated by digital content providers in a manner that integrates contextual information derived from analyses of the viewing event, viewer profile, and the like. For example, it may be ascertainable from various applications running on computing device 260 that it is the birthday of the significant other of user 270 or a special holiday (i.e., calendar entry), in which first digital content 510 may comprise a personalization feature integrated within the digital content (e.g., "Don't forget to get a birthday present for your significant other!"). It should be noted that the digital content depicted within the pixels are not only limited to digital may include, for example, push notifications of users 270 and 290, travel reminders, and any other applicable alerts may be depicted in a privatized manner based on the viewing event.

Figure 6:
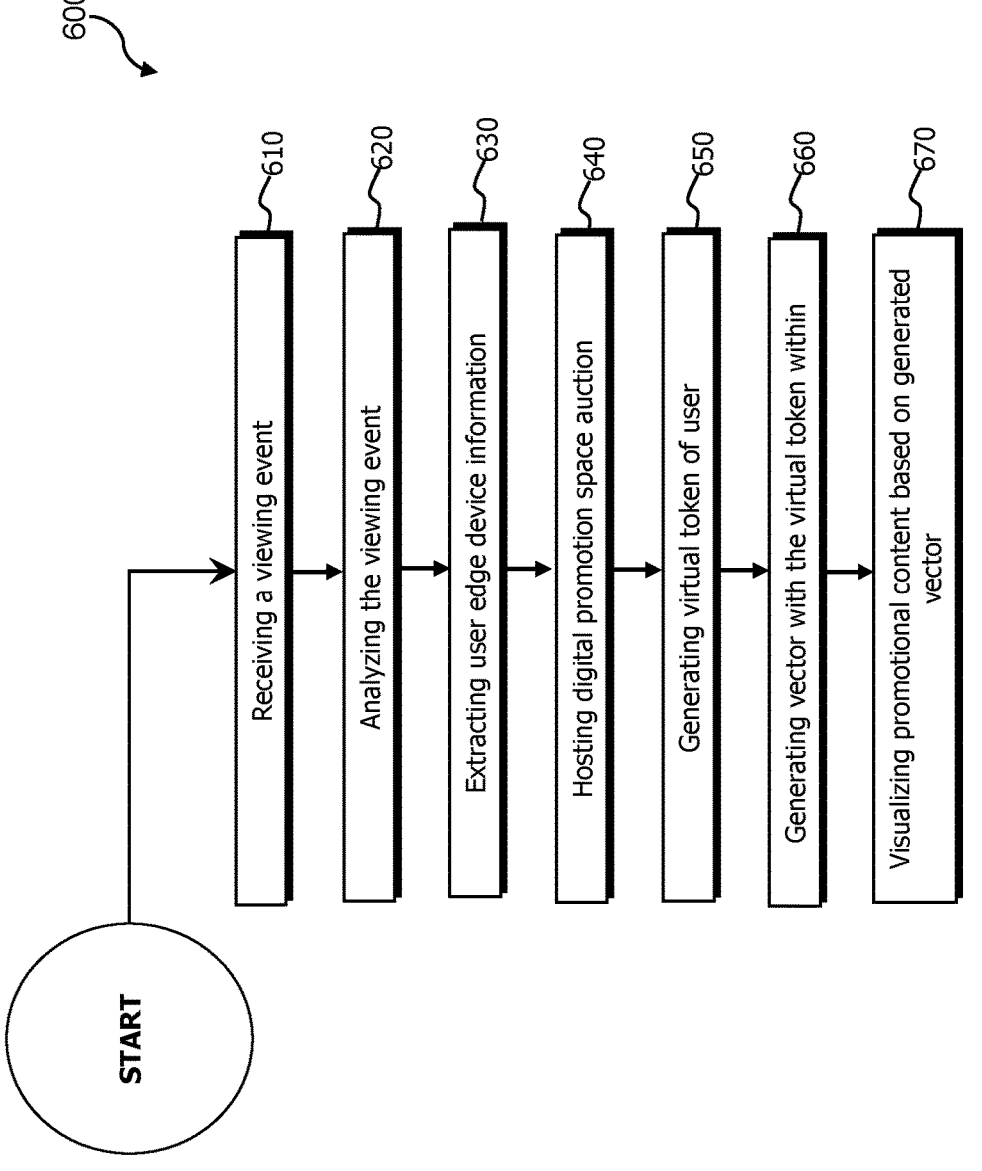
FIG. 6 illustrates an exemplary flowchart depicting a method for parallel reality-based content presentation, according to an exemplary embodiment.

With the foregoing overview of the example architecture, it may be helpful now to consider a high-level discussion of an example process. FIG. 6 depicts a flowchart illustrating a computer-implemented process 600 for parallel reality-based content presentation, consistent with an illustrative embodiment. Process 600 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At step 610 of process 600, parallel reality module 220 receives the viewing event(s). A viewing event is any applicable trigger, interaction, and/or experience between a user and digital content indicators (e.g., QR codes scanned by computing devices 260 and 280, motion/movement based digital content, and the like). It should be noted that viewing events may be initiated in a variety of ways including, but not limited to a viewer making eye contact with a viewing event indicator, an applicable computing device being detected within proximity of a viewing event indicator, users 270 and 290 performing triggering events (e.g., discussing conversations in public venue, attending a particular event, scanning their boarding pass, etc.), and the like.

At step 620 of process 600, viewing event analysis module 310 analyzes the viewing event. As previously mentioned, viewing event analysis module 310 may utilize one or more of multi-media detection/analyses systems, computer visioning systems, natural language processing ("NLP")/linguistics processing, predictive analytics, behavioral classification techniques, and the like on viewing events associated with users 270 and 290. In some embodiments, analyses of the viewing events allow user data associated with users 270 and 290 to be ascertained (e.g., applicable data derived from computing devices 260 and 280), in which the respective user data is continuously updated in the respective viewer profiles associated with users 270 and 290.

At step 630 of process 600, user edge device information is extracted by privatization module 240. In some embodiments, user edge device information (e.g., mobile number, message header, and the like) is derived from computing devices 260 and 280 and user data including, but not limited to personal information, biological data, behavioral data, socio-demographic data, psychographic data, social media-based data, user analytics (e.g., user preferences, activity patterns, etc.), and the like. In some embodiments, the user edge device information is utilized to generate a request to privatize the user data associated with users 260 and 280, in which the request is transmitted to PR credential module 370 and PR credential module 370 may query privatization module database 250 for the appropriate virtual token that aligns with the request based on the extracted user edge device information.

At step 640 of process 600, PR credential module 370 hosts the auction for the digital content opportunity associated with the viewing event. The digital content opportunity (e.g., applicable display associated with the viewing event) is configured to allow digital content providers to bid for the digital content opportunity in a manner that supports targeting towards the viewers associated with viewing events. In some embodiments, privatization module 240 is further configured to generate thresholds associated with auctioning of a digital content opportunity, in which the thresholds may be based on one or more of relevance to users 270 and/or 290, viewing event requirements (e.g., dimensions of display, TAP network bandwidth, etc.), location of the venue associated with the viewing event, and the like.

At step 650 of process 600, PR credential module 370 generates the virtual token for each viewer. In some embodiments, the process of generating the privatized parallel reality-based credential comprises vectorizing the virtual token and a subset of the plurality of user data, which allows the vector to comprise not only the user edge device information but also a user specific virtual token that indicates that sensitive user information of the respective user has been privatized and secured from the applicable digital content provider that wins the digital content opportunity.

For example, a vector associated with user 270 may comprise the virtual token, the message header, and the user edge device information, in which the virtual token assures that data scrubbing has been performed on confidential and/or sensitive information associated with the user.

At step 660 of process 600, approved list module 380 provides the access list to one or more servers associated with the digital content provider. In particular, the digital content provider that wins the auction for the digital content opportunity resulting in the approval list being transmitted to the applicable digital content server to selection of digital content that aligns with each respective viewer including on the list. In some embodiments, the scrubbing mechanism utilized by Data anonymization module 360 is employed based on viewer preferences and/or viewer profile analyses in order for approved list module 380 to create a dynamic target pool of viewers with associated vectors comprising redacted user information and virtual tokens.

At step 670 of process 600, visualization module 330 displays digital content to viewers based on the generated vector. Due to the fact that the vectors comprise the virtual token along with the user edge device information for computing devices of the respective viewers of a viewing event, visualization module 330 is able to receive pixel assignments received from pixel generation module 320 resulting in visualization module 330 generating pixels to simultaneously send various colors of light in a multitude of directions to the viewers. It should be noted that visualization of digital content may be rendered in a physical space, virtual space (e.g., virtual reality, augmented reality, extended reality, mixed reality, and the like), computing device, display device, or any other applicable mechanisms configured to receive digital promotional content. In various embodiments, visualization module 330 utilizes generative adversarial networks (GANs) to render digital content, in which the digital content is selected based on analysis of the viewer profile associated with the user of the viewing event and/or receiving computing device. Visualization module 330 may communicate with machine learning module 350 in order to operate a feedback loop configured to optimize the presentation of the digital content via supervised and/or unsupervised learning.

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-payment devices or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter payment device or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalent.

What is claimed is:

1. A computer-implemented method for parallel reality-based digital content presentation, the method comprising:
   receiving, by a computing device, a viewing event;
   analyzing, by the computing device, the viewing event;
   generating, by the computing device, a privatized parallel reality-based credential comprising a virtual token associated with a user based on the analysis; and
   visualizing, by the computing device, a plurality of parallel reality pixels in accordance with the privatized parallel reality-based credential.

2. The computer-implemented method of claim 1, wherein analyzing the viewing event comprises:
   cleansing, by the computing device, a plurality of user data associated with the user;
   wherein the user is associated with the viewing event.

3. The computer-implemented method of claim 2, wherein cleansing the plurality of user data comprises:
   detecting, by the computing device, a user edge device associated with the user;
   extracting, by the computing device, a plurality of user edge device information from the user edge device; and
   generating, by the computing device, a request to privatize the plurality of user data based on the extracted user edge device information.

4. The computer-implemented method of claim 2, wherein generating the privatized parallel reality-based credential comprises:
   generating, by the computing device, the virtual token associated with the user;
   vectorizing, by the computing device, the virtual token and a subset of the plurality of user data; and
   generating, by the computing device, a hash of the resulting vector of the vectorizing.

5. The computer-implemented method of claim 1, further comprising:
   determining, by the computing device, an approval list associated with distribution of digital content;
   wherein distribution of digital content is based on the privatized parallel reality-based credential.

6. The computer-implemented method of claim 2, wherein the plurality of user data comprises one or more of a user internet-based activity, a user location, and a user pattern analytics profile.

7. The computer-implemented method of claim 1, wherein the privatized parallel reality-based credential is configured to be utilized by a digital content server.

8. A computer program product for parallel reality-based digital content presentation, the computer program product comprising one or more storage devices and program instructions collectively stored on the one or more storage devices, the stored program instructions comprising:
   program instructions to receive a viewing event;
   program instructions to analyze the viewing event;
   program instructions to generate a privatized parallel reality-based credential comprising a virtual token associated with a user based on the analysis; and
   program instructions to visualize a plurality of parallel reality pixels in accordance with the privatized parallel reality-based credential.

9. The computer program product of claim 8, wherein the program instructions to analyze the viewing event comprise:
   program instructions to cleanse a plurality of user data associated with the user;
   wherein the user is associated with the viewing event.

10. The computer program product of claim 9, wherein program instruction to cleanse the plurality of user data comprise:
   program instructions to detect a user edge device associated with the user;
   program instructions to extract a plurality of user edge device information from the user edge device; and
   program instructions to generate a request to privatize the plurality of user data based on the extracted user edge device information.

11. The computer program product of claim 9, wherein program instructions to generate the privatized parallel reality-based credential comprise:
   program instructions to generate the virtual token associated with the user;
   program instructions to vectorize the virtual token and a subset of the plurality of user data; and program instructions to generate a hash of the resulting vector of the vectorizing.

12. The computer program product of claim 8, further comprising:

program instructions to determine an approval list associated with distribution of digital content;

wherein distribution of digital content is based on the privatized parallel reality-based credential.

13. The computer program product of claim 9, wherein the plurality of user data comprises one or more of a user internet-based activity, a user location, and a user pattern analytics profile.

14. The computer program product of claim 8, wherein the privatized parallel reality-based credential is configured to be utilized by a digital content server.

15. A computer system for parallel reality-based digital content presentation, the computer system comprising:

one or more processors;

one or more computer-readable memories;

program instructions stored on at least one of the one or more computer-readable memories for execution by at least one of the one or more processors, the program instructions comprising:

program instructions to receive a viewing event;

program instructions to analyze the viewing event; and program instructions to generate a privatized parallel reality-based credential comprising a virtual token associated with a user based on the analysis; and program instructions to visualize a plurality of parallel reality pixels in accordance with the privatized parallel reality-based credential.

16. The computer system of claim 15, wherein the program instructions to analyze the viewing event comprise:

program instructions to cleanse a plurality of user data associated with the user;

wherein the user is associated with the viewing event.

17. The computer system of claim 16, wherein program instruction to cleanse the plurality of user data comprise:

program instructions to detect a user edge device associated with the user;

program instructions to extract a plurality of user edge device information from the user edge device; and program instructions to generate a request to privatize the plurality of user data based on the extracted user edge device information.

18. The computer system of claim 16, wherein program instructions to generate the privatized parallel reality-based credential comprise:

program instructions to generate the virtual token associated with the user;

program instructions to vectorize the virtual token and a subset of the plurality of user data; and program instructions to generate a hash of the resulting vector of the vectorizing.

19. The computer system of claim 16, wherein the plurality of user data comprises one or more of a user internet-based activity, a user location, and a user pattern analytics profile.

20. The computer system of claim 15, wherein the privatized parallel reality-based credential is configured to be utilized by a digital content server.

* * * * *